United States Patent [19]

Schuler et al.

[11] Patent Number: 5,422,176
[45] Date of Patent: Jun. 6, 1995

[54] CURED PARTICLE INCORPORATING A CURED COPOLYMER PROTECTIVE COLLOID

[75] Inventors: Bernhard Schuler, Mannheim; Rainer Dyllick-Brenzinger, Weinheim; Ralf Biastoch, Speyer, all of Germany

[73] Assignee: BASF Aktiengesellschaft, Ludwigshafen, Germany

[21] Appl. No.: 132,216

[22] Filed: Oct. 6, 1993

Related U.S. Application Data

[63] Continuation of Ser. No. 21,101, Feb. 23, 1993, abandoned.

[30] Foreign Application Priority Data

Mar. 25, 1992 [DE] Germany .................. 42 09 632.4

[51] Int. Cl.$^6$ .................. B32B 3/26; C08L 61/28
[52] U.S. Cl. .................. 428/321.5; 523/206; 524/512; 525/936
[58] Field of Search .................. 521/69, 74, 187; 523/206, 210; 524/509, 512; 428/321.5

[56] References Cited

U.S. PATENT DOCUMENTS

| | | |
|---|---|---|
| 2,300,920 | 11/1942 | Heuer . |
| 3,033,833 | 5/1962 | Le Fevre .................. 526/287 |
| 4,406,816 | 9/1983 | Sliwka .................. 521/69 |
| 4,436,875 | 3/1984 | Janiga .................. 525/385 |
| 4,727,116 | 2/1988 | Lange .................. 525/326.9 |

FOREIGN PATENT DOCUMENTS

| | | |
|---|---|---|
| 0026914 | 4/1981 | European Pat. Off. . |
| 1083609 | 1/1955 | France . |
| 115630 | 9/1981 | Japan . |

*Primary Examiner*—Christopher Henderson
*Attorney, Agent, or Firm*—Oblon, Spivak, McClelland, Maier & Neustadt

[57] ABSTRACT

The invention relates to copolymers containing a) 20-90% of 2-acrylamido-2-methylpropanesulfonic acid, sulfoethyl or sulfopropyl (meth) acrylate or vinylsulfonic acid, b) 0-50% of a vinylic acid, c) 0-70% of methyl or ethyl acrylate or methacrylate, $C_2$—$C_4$-hydroxyalkyl acrylate or N-vinylpyrrolidone and d) 0.1-10% of styrene or $C_4$—$C_{18}$-alkyl acrylate or $C_4$—$C_{18}$-alkyl methacrylate.

The copolymers according to the invention are particularly suitable as protective colloids for microencapsulation.

7 Claims, No Drawings

CURED PARTICLE INCORPORATING A CURED COPOLYMER PROTECTIVE COLLOID

This application is a continuation of application Ser. No. 08/021,101, filed on Feb. 23, 1992, now abandoned.

The present invention relates to copolymers which contain a) 20–90% of 2-acrylamido-2-methylpropanesulfonic acid, sulfoethyl or sulfopropyl (meth)acrylate or vinylsulfonic acid, b) 0–50 % of a vinylic acid, c) 0–70% of methyl or ethyl acrylate or methacrylate, $C_2$—$C_4$-hydroxyalkyl acrylate or N-vinylpyrrolidone and d) 0.1–10% of styrene or $C_4$—$C_{18}$-alkyl acrylate or $C_4$—$C_{18}$-alkyl methacrylate.

The compounds a) are usually employed as salts, eg. as alkali metal or ammonium salts. The sodium, potassium and ammonium salts are particularly suitable. The salts of 2-acrylamido-2-methylpropanesulfonic acid are preferred.

Examples of compounds b) are maleic acid, itaconic acid, acrylic acid and methacrylic acid. The unsaturated monobasic acids acrylic acid and methacrylic acid are particularly suitable.

Examples of $C_2$—$C_4$-hydroxyalkyl acrylates c) which can be used are the ethyl, n-propyl, isopropyl and n-butyl compounds.

Preferred compounds c) are methyl and ethyl acrylate or methacrylate.

Examples of $C_4$—$C_{18}$-alkyl acrylates and methacrylates d) are the n-butyl, sec-butyl, tert-butyl, pentyl, hexyl, ethylhexyl, octyl, decyl, dodecyl and stearyl compounds. The n-butyl and ethylhexyl compounds are particularly suitable.

The copolymers according to the invention are expediently prepared by heating water to 30–100° C., preferably 75–90° C., and then adding a portion or the total amount of a polymerization initiator. Then, according to the invention, the monomer mixture is added in one feed or a plurality of separate feeds together with the remainder of the initiator. The addition usually takes 1–4 hours, but often only 1–2 hours. The mixture is then stirred for about 1–3 hours. A clear solution or a milky dispersion is obtained depending on the ratio of the hydrophilic monomers a) to c) to the hydrophobic monomers d).

Details of the preparation are to be found in the examples, in which the parts and percentages are by weight unless otherwise indicated.

Particularly suitable polymerization initiators are water-soluble compounds which form free radicals by thermal decomposition, such as sodium, potassium and ammonium peroxodisulfate. However, it is also possible according to the invention to employ polymerization initiators which produce free radicals by redox processes. A particular example is the $H_2O_2$/ascorbic acid/Fe sulfate system. In such cases, according to the invention, a portion of the redox initiator is present in the aqueous phase from the outset and the remainder is added.

The copolymers according to the invention are particularly suitable as protective colloids in the preparation of microcapsule dispersions of melamine/formaldehyde precondensates, for example by the process described in EP 026 914.

Compared with, for example, the protective colloids described in EP 026 914, the copolymers according to the invention have an outstanding dispersion-stabilizing action. This effect is probably achieved owing to the incorporation of a small amount of a hydrophobic monomer d) and is observed even when the content of d) in the copolymers according to the invention is very low. It is possible owing to this, in contrast to the process described in EP 026 914, to dispense with addition of the melamine/formaldehyde precondensate and to have the total amount of melamine/formaldehyde precondensate present from the outset. The dispersion of the core material and the aqueous phase is stabilized from the outset.

In a preferred embodiment, an emulsion of a core material, which can be composed of liquid, solid or gaseous substances which are insoluble or essentially insoluble in water, and preferably distilled water, in which a melamine/formaldehyde precondensate and a copolymer according to the invention are dissolved, is adjusted to a pH of 3–6.5 with an acid. The acid can be an organic or mineral acid. Suitable examples are formic acid, acetic acid and phosphoric acid. The particle size of the emulsion is adjusted using a high-performance dispersing unit at 0–60° C. in particular 25–35° C. The emulsion itself is stable throughout the dispersing process. The minimum average particle size which can be produced by the dispersing unit, which depends on its speed of rotation, is reached in practice after 10–30 minutes, in particular after 10–20 minutes. The exact duration depends on the required average particle size and is usually longer for lower average particle sizes and higher speeds of rotation. The stable emulsion can then be cured to a microcapsule dispersion, preferably by stirring at low sheer, for example with an anchor agitator or propeller mixer, at 50–100° C. Typical examples of core materials and melamine/formaldehyde precondensates are described in EP 026 914.

EXAMPLE 1

1050 g of water are introduced into a cylindrical 4 l vessel with an incorporated anchor agitator and are heated to 75° C. 0.15 g of potassium persulfate is added at this temperature. Then, over the course of one hour, a mixture of 80 g of acrylic acid, 80 g of methyl acrylate and 4 g of styrene, a solution of 236 g of 2-acrylamido-2-propanesulfonic acid in 400 g of water which has been neutralized with 305 g of 20 % strength NaOH, and a solution of 1.35 g of potassium persulfate in water are run in simultaneously. Polymerization is then continued at 75° C. for three hours. A colorless, slightly cloudy viscous solution is obtained.

EXAMPLES 2 TO 8

Seven other sulfo-containing copolymers were synthesized by the above method. The amounts of starting materials are listed in Table 1.

TABLE 1

AMPA: 2-acrylamido-2-methylpropanesulfonic acid
AA: acrylic acid
HAA: methacrylic acid
MA: methyl acrylate
VP: N-vinylpyrrolidone
S: styrene
EHA: ethylhexyl acrylate
BA: n-butyl acrylate

| Ex. No. | AMPA | AA | MAA | MA | VP | S | EHA | BA |
|---|---|---|---|---|---|---|---|---|
| 1 | 59 | 20 | | 20 | | 1 | | |
| 2 | 59.5 | 20 | | 20 | | 0.5 | | |
| 3 | 45 | 40 | | 10 | | 5 | | |
| 4 | 58 | 20 | | 20 | | | 2 | |
| 5 | 49 | | | 20 | 30 | 1 | | |

TABLE 1-continued

| | | | | |
|---|---|---|---|---|
| 6 | 69 | | 30 | 1 |
| 7 | 74 | | 25 | 1 |
| 8 | 59 | 20 | 20 | 1 |

EXAMPLE 9

1050 g of water are introduced into a cylindrical 4 l vessel with an incorporated anchor agitator and are heated to 80° C. 1.5 g of potassium persulfate are added at this temperature. Then, over the course of one hour, a mixture of 80 g of acrylic acid, 80 g of methyl acrylate and 4 g of styrene and a solution of 236 g of 2-acrylamido-2-propanesulfonic acid in 400 g of water which has been neutralized with 305 g of 20 % strength NaOH are run in simultaneously. Polymerization is then continued at 80° C. for one hour. A colorless, slightly cloudy viscous solution is obtained.

COMPARATIVE EXAMPLES 1 TO 6 without hydrophobic monomer d)

Sulfo-containing copolymers with the compositions listed in Table 2 were prepared by the method of Example 1.

TABLE 2

| Comp. Ex. No. | AMPA | AA | MAA | MA | VP |
|---|---|---|---|---|---|
| 1 | 60 | 20 | | 20 | |
| 2 | 50 | 40 | | 10 | |
| 3 | 50 | | | 20 | 30 |
| 4 | 70 | | | 30 | |
| 5 | 75 | | 25 | | |
| 6 | 100 | | | | |

EXAMPLE 10

1259 g of water, 1040 g of a solution of a coloring agent (eg. 50 g of crystal violet lactone in an organic solvent such as diisopropylnaphthalene), 200 g of a sulfo-containing copolymer of Examples 1 to 9 and 229 g of a partially etherified, methylolated melamine/formaldehyde resin (see Example 1, lines 23/24, EP-B-26,914) are introduced into a cylindrical 4 l vessel with incorporated high-performance dispersing unit. The pH is adjusted to 3.5–4.5 with formic acid and then the mixture is dispersed at 30° C. for 10 to 20 minutes. The resulting dispersion has a very narrow particle size distribution. The average particle size can be adjusted by the speed of rotation of the dispersing unit. The dispersion is then transferred into a cylindrical 4 l vessel which is equipped with an anchor agitator or propeller mixer and is cured at low shear and at 80° C. The resulting microcapsules have excellent impermeability, very low friction sensitivity and high copying intensity.

EXAMPLE 11

The following feeds are prepared in three reservoir vessels:

1. 4190 g of water, 1130 g of the sulfo-containing copolymer from Example 1 and 700 g of formic acid (10% strength);
2. 5410 g of a coloring agent solution (eg. crystal violet lactone in an organic solvent such as diisopropylnaphthalene);
3. 2380 g of water and 1190 g of a 70% strength partially etherified, methylolated melamine/formaldehyde resin.

Feeds 1 to 3 are delivered with the aid of piston pumps through tube lines to a dispersing apparatus in the ratio 95:165:165 and mixed immediately before entry into the apparatus. The dispersion leaving the apparatus is stable. 2 kg of this dispersion are collected in a cylindrical 4 l stirred vessel and cured at 80° C. with low shear using an anchor agitator or propeller mixer. The resulting microcapsules have excellent impermeability, very low friction sensitivity and high copying intensity.

This procedure is particularly suitable for continuous dispersion.

COMPARATIVE EXAMPLE

The method of Example 10 is used but using a sulfo-containing copolymer of Comparative Examples 1 to 6 in place of a sulfo-containing copolymer of Examples 1 to 9. Dispersion with a high-performance dispersing unit for 10-20 minutes results in a substantially unstable dispersion with a very broad particle size distribution. The dispersed droplets coalesce after transfer into the cylindrical 4 l vessel with an anchor agitator or propeller mixer. As a rule, curing to a microcapsule dispersion is impossible.

We claim:

1. A cured particle comprising
   A) an aqueous insoluble core material,
   B) a melamine/formaldehyde precondensate, and
   C) a cured copolymer protective colloid comprising
      a) 40–75% of 2-acrylamido-2-methylpropanesulfonic acid, sulfoethyl or sulfopropyl (meth)acrylate or vinylsulfonic acid,
      b) 10–30% of acrylic acid or methacrylic acid,
      c) 10–50% of methyl or ethyl acrylate or methacrylate, $C_2$—$C_4$-hydroxyalkyl acrylate or N-vinylpyrrolidone and
      d) 0.5–5% of styrene or $C_4$—$C_{18}$-alkyl acrylate or methacrylate.

2. A cured particle comprising
   A) an aqueous insoluble core material.
   B) a melamine/formaldehyde precondensate, and
   C) a cured copolymer protective colloid comprising
      a) 40–75% of 2-acrylamido-2-methylpropanesulfonic acid, sulfoethyl or sulfopropyl (meth)acrylate or vinylsulfonic acid,
      b) 10–40% of acrylic acid or methacrylic acid,
      c) 10–50% of methyl or ethyl acrylate or methacrylate or N-vinylpyrrolidone and
      d) 0.5–5% of styrene or $C_4$—$C_{18}$-alkyl acrylate or methacrylate.

3. A cured particle consisting of:
   A) an aqueous insoluble core material,
   B) a melamine/formaldehyde precondensate, and
   C) a cured copolymer protective colloid, wherein said cured copolymer protective colloid C) consists of 45–74% by weight 2-acrylamido-2-methylpropanesulfonic acid, 20–40% by weight of acrylic acid, 10–30% by weight of methyl acrylate and 0.5–5% by weight of styrene.

4. The cured particle of claim 1, consisting of components A), B), and C).

5. The cured particle of claim 2, consisting of components A), B), and C).

6. The cured particle according to claim 1, wherein said cured copolymer productive colloid C) consists of components a), b), c) and d).

7. The cured particle according to claim 2, wherein said cured copolymer protected colloid C) consists of components a), b), c) and d).

* * * * *